350-336 SR

OR 3,989,353

SEARCH ROOM

United States Patent [19]

Phalan

SUBSTITUTE FOR MISSING OR

[11] 3,989,353

[45] Nov. 2, 1976

[54] SOLID PLANAR LIQUID CRYSTAL DISPLAY WITH MATCHING LEADS

[75] Inventor: James M. Phalan, Sunnyvale, Calif.

[73] Assignee: Intel Corporation, Santa Clara, Calif.

[22] Filed: Mar. 20, 1975

[21] Appl. No.: 560,255

Related U.S. Application Data

[63] Continuation of Ser. No. 412,003, Nov. 1, 1973, abandoned.

[52] U.S. Cl. .......... 350/160 LC

[51] Int. Cl.² .......... G02F 1/13

[58] Field of Search .......... 350/160 R, 160 LC

[56] References Cited

UNITED STATES PATENTS

| | | | |
|---|---|---|---|
| 3,712,047 | 1/1973 | Girard | 350/160 LC X |
| 3,771,855 | 11/1973 | Burns | 350/160 LC |
| 3,814,501 | 6/1974 | Schindler | 350/160 LC |
| 3,897,996 | 8/1975 | Tsunoda et al. | 350/160 LC X |

*Primary Examiner*—Edward S. Bauer
*Attorney, Agent, or Firm*—Spensley, Horn & Lubitz

[57] ABSTRACT

The present invention is a liquid crystal display which has liquid crystal disposed between a first and second substrate. The first substrate has transparent conductive indicia members with blending conductive leads forming conductive paths to the transparent conductive indicia members. The second substrate has a solid conductive reflective portion or surface. Application of a potential difference between the indicia members and reflective surface causes predetermined indicia and leads to become energized, and the liquid crystal near the transparent indicia and conductive leads is activated, however the leads do not appear activated since the blending lead obscure the activated liquid crystal.

8 Claims, 5 Drawing Figures

Fig. 4
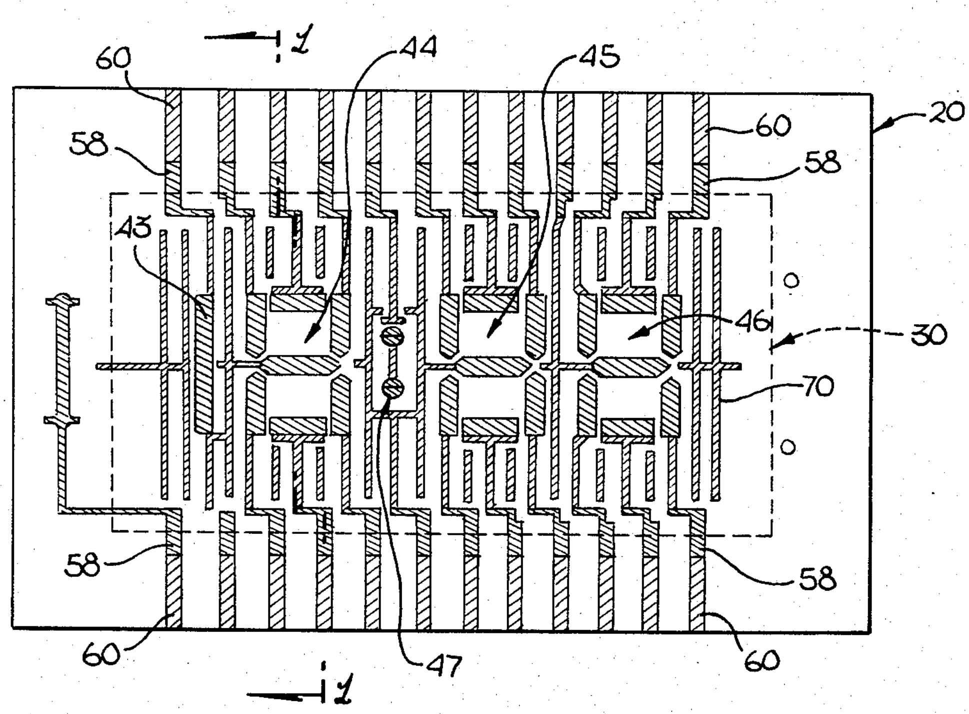
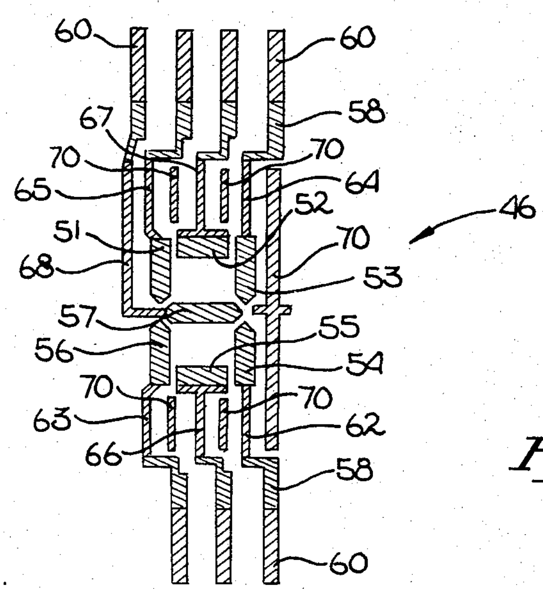
Fig. 5

SOLID PLANAR LIQUID CRYSTAL DISPLAY WITH MATCHING LEADS

This is a continuation of application Ser. No. 412,003, filed Nov. 1, 1973 and now abandoned.

BACKGROUND OF THE INVENTION

1. Field of the Invention

This invention relates to a liquid crystal display.

2. Prior Art

Most liquid crystal devices are comprised of two spaced parallel substrates with liquid crystal between the substrates. Electrical conductors for the application of a selected voltage are formed on internal facing sides of the substrates. When a voltage is applied to the liquid crystal via the electrical conductors, the liquid crystal changes from a first state to a second state. Typically, in the first state, the liquid crystal is transparent, while in the second state it forms a light altering (e.g., dynamic scattering or field effect).

By placing formed electrodes in certain desired locations specific images coinciding with the formed electrode can be selectively made to appear in the liquid crystal. For example, one form of the liquid crystal display unit employs front and rear transparent substrates, and is viewed from the front substrate. The front and rear substrates and front electrodes are transparent, while the rear electrode may be reflective or transparent. In addition, the rear substrate may employ an additional layer of coating to achieve certain desired optical effects. This additional layer may be located on the external facing side of the rear substrate. When the device is used, light is directed into the front side of the display and the electrodes are energized. Various parts of the liquid crystal become light enabled (e.g. scattering) and the effect is to view enabled (e.g. scattering) portions on a contrasting or mirror-like background. There are, of course, other forms of liquid crystal display which do not employ various physical effects and which may employ the invention described herein.

The operation and construction of liquid crystal display devices, such as described above, is well known in the prior art. Two examples of such prior art are U.S. Pat. No. 3,322,485 and U.S. Pat. No. 3,612,654.

There have been numerous problems in prior art liquid crystal display devices regarding the fragmented or pad-like configuration of the contrasting (e.g. reflective) surface. This pad-like configuration has resulted in the energized segment having one contrast to certain portions of the display and another contrast as to other portions of the display. This results in poor overall contrast. This problem is solved by the present invention by creating a solid contrasting (e.g. reflective) surface on the second substrate. A further benefit is that the unpowered segments are made less visible because there is no adjacent "bare" glass to provide optical contrast.

A primary characteristic of prior art liquid crystal display devices is that both substrates are required to be perfectly aligned both in the horizontal and vertical plane. The present invention eliminates any critical alignment required between the two substrates. The present invention embodies a structure which will allow mechanical alignment assembly techniques for positioning the two substrates resulting in substantial manufacturering economics.

However, when a solid reflective surface is employed on one substrate the undesirable effect of lead illumination occurs. It is believed that the prior art solid reflective surfaces were not considered because of lead illumination, instead pads were employed. The present invention solves the problem of lead illumination by forming the leads from an opaque conductor having blending characteristic, such as having the same reflective properties as the first substrate.

Haze formation was also a problem in the prior art. Haze was created due to the molecular alignment characteristics of liquid crystal when it contacted a surface. In the present invention haze formation is reduced since the number of different surfaces the liquid crystal must contact is reduced.

SUMMARY OF THE INVENTION

A liquid crystal display having a first and second substrate is disclosed. The first substrate has one surface with transparent conductive indicia members and blending conductive reflective leads, disposed thereon. The second substrate is reflective and conductive or has one surface which is reflective and conductive. The second substrate is disposed in a cooperative relationship with the first substrate and a potential difference is applied between the indicia members and the conductive surface of the second substrate which activates the liquid crystal (adjacent the indicia members). This activation of the liquid crystal adjacent the indicia members also results in the liquid crystal adjacent the conductive leads being activated but such are not visible since the opaque conductive leads act as an optical shield. Thus, only selected indicia members appear to be illuminated.

An object of this present invention is to create a liquid crystal display which does not require critical alignment between the first and second substrates.

The present invention also makes liquid crystal displays more cosmetically pleasing because it eliminates the pad-like fragmented reflective surface, and eliminates illumination of the conductive leads while reducing haze formation and improving definition.

BRIEF DESCRIPTION OF THE DRAWINGS

FIG. 4 is a view of the opaque conductors and transparent conductors both disposed on the first substrate, which is in alignment with the second substrate; and FIG. 5 is a blown up view of a digit illustrating the transparent and opaque conductors.

DETAILED DESCRIPTION OF THE PREFERRED EMBODIMENT

The liquid crystal display is comprised of a liquid crystal substance contained between coplanar substrates which are capable of applying a voltage across the liquid crystal at specific predetermined points. The present invention deals with methods for improving the structure of the liquid crystal display so as to improve the cosmetic appearance by eliminating both lighted leads and misalignment problems, while faciliating ease of manufacturing. The liquid crystal display operates on a very low power source and can be used economically and efficiently in various operations such as in; electrical calculating units, computer panel displays, numeric readouts, flat screen television, score boards for athletic events and for many other purposes. However, in the presently preferred embodiment and as described hereinafter, the liquid crystal display will provide a numerical readout for a wrist watch. It should be noted that the presently preferred embodiment utilizes the liquid crystal display for displaying time on a wrist watch, however, the invention is not so restricted and this utilization is used for illustration purposes only.

Figure 1:
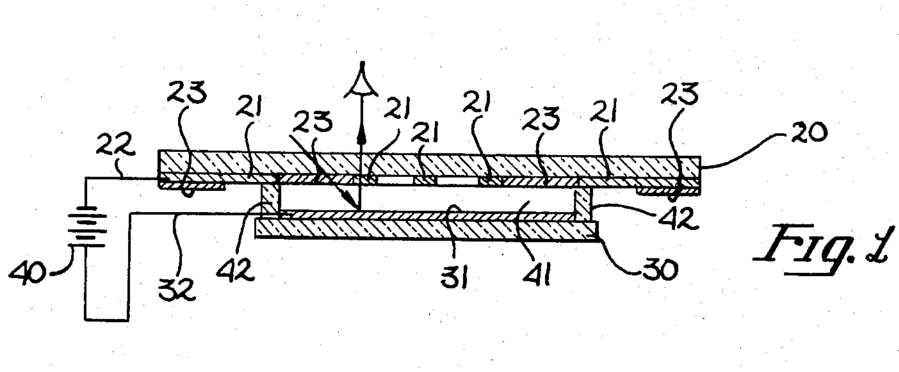
FIG. 1 is a cross-sectional view of the presently preferred embodiment of the liquid crystal display, taken along line 1—1 of FIG. 4.

Now referring to FIG. 1, a cross-section of a liquid crystal display is shown. That display has several basic elements, including: a "front" or first substrate 20 which is transparent, a "rear" or second substrate 30 which is reflective, a spacer 42 which maintains the parallelism of the substrates, liquid crystal 41 which is disposed between the substrates, and a power source 40 having leads 22 and 32 which may create a potential difference between the two substrates at specific predetermined points. The first substrate 20 has both transparent conductive areas 21 and opaque conductive stripes 23 disposed thereon. The transparent conductive areas 21, which in the presently preferred embodiment are indium oxide, form the indicia members. The opaque conductive stripes 23, which in the presently preferred embodiment are gold, are disposed so as to form conductive leads to the transparent conductor indicia members and to obscure enabled liquid crystal material adjacent thereto. The later functioning is important while the conductive connection can be made by the transparent conductive members being continuously formed with the gold or other blending or obscuring material formed thereover.

It should be noted that FIG. 1 is a cross-sectional view taken along line 1—1 of FIG. 4. It should also be understood that the transparent conductive areas have been designated generally 21, and the opaque conductive areas have been designated generally 23. These general designations identify which conductive element is being discussed hereinafter, however specific reference numerals are used to identify specific conductive areas, comprising either the opaque or the transparent conductive areas, in addition to the general designation (i.e. 21 or 23).

Figure 2:
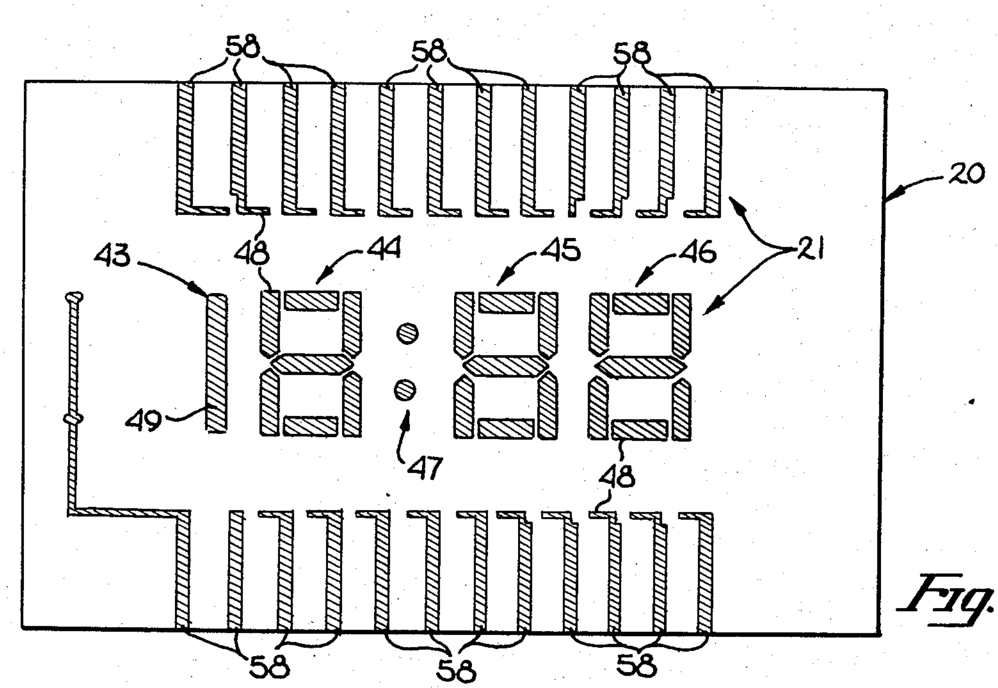
FIG. 2 is a view of the transparent indicia members disposed on the first substrate of the presently preferred embodiment.

In the presently preferred embodiment, the first substrate 20, which is transparent, is normally made from glass of the type commonly used in the trade, which should be dimensionally stable. One surface of the first substrate has electrically conductive areas 21 (e.g., indium oxide) which are transparent, as shown in FIG. 2. It should be noted that FIG. 2 contains only the transparent conductive areas, which are labeled generally 21, in order to simplify this description. The completed substrate 20 contains both the transparent conductive areas and opaque conductive areas as shown in FIG. 4. The electrically conductive areas 21 are formed on the substrate 20 by chemical coating, photo fabrication, evaporation, spraying, vacuum deposition, pyrolytic deposition, screening photoresist coating, exposure, development, etching or other known methods for defining lines and areas on substrates, into the shape of indicia members. The indicia members in the particular embodiment are comprised of four digits 43, 44, 45, 46 and separating marks 47 (e.g., colon). It is of course, within the scope of this invention to employ indicia which do not comprise alpha numeric symbols but only comprise marks, dots, or other symbols. The left leading indicia digit 43 is formed by conductive area 49 which is in the shape of the digit 1. Separating mark 47 is composed of two conductive areas 47 which are in the form of two dots. The remaining three display indicia digits are each comprised of seven conductive areas. These seven conductive areas are arranged such that when various combinations are selectively energized, all of the numerals 0 through 9 may be formed. This arrangement as shown in digit 46, (FIG. 5) comprises three horizontal parallel conductive areas, a top area 52, a middle area 57, and a bottom area 55. The four vertical conductive areas are disposed perpendicular to the three horizontal conductive areas such as to form two squares, one square disposed on top of the other such that the middle area 57 forms a side of both squares and is common to each square. The vertical conductive areas 51 and 56 form the left-hand side of the squares while areas 53 and 54 form the right-hand vertical sides of the squares. It should be noted that the two remaining indicia digits 44 and 45 are formed by the same seven segmented conductive areas as is indicia digit 46. Separated from and not electrically connected to, the indicia members are a plurality of conductive leads 58 which may be connected to a power source 40 such that each conductive area of the indicia members may be independently capable of being energized. It is within the scope of the invention to employ multiplexing techniques and interconnect various areas to minimize individually formed connections to the power source. It should be noted that the conductive leads 58 are not connected to the transparent conductive areas 21 but are separated from the indicia members by a space 48 as best shown in FIG. 2.

It is within the scope of the invention to directly connect leads 58 to the indicia members provided they are made from a blending material or one that forms an optical shield or coated with such a blending obscuring or shielding material. In this regard, it is possible to make leads 56 and the connection to the indicia from one material such as gold. The portion of leads 58 as shown in FIG. 2 are not visible to the member or adjacent the liquid crystal so that such portion of leads 58 may be made from any compatable conductive material. In an alternate embodiment the leads 58 may be connected to the indicia members and be made from a transparent conductor such as indium oxide. However, in this type of application, an opaque or blending conductor must be disposed over the transparent conductive lead to provide the optical shield (the optical shield effect is more fully described below).

Figure 3:
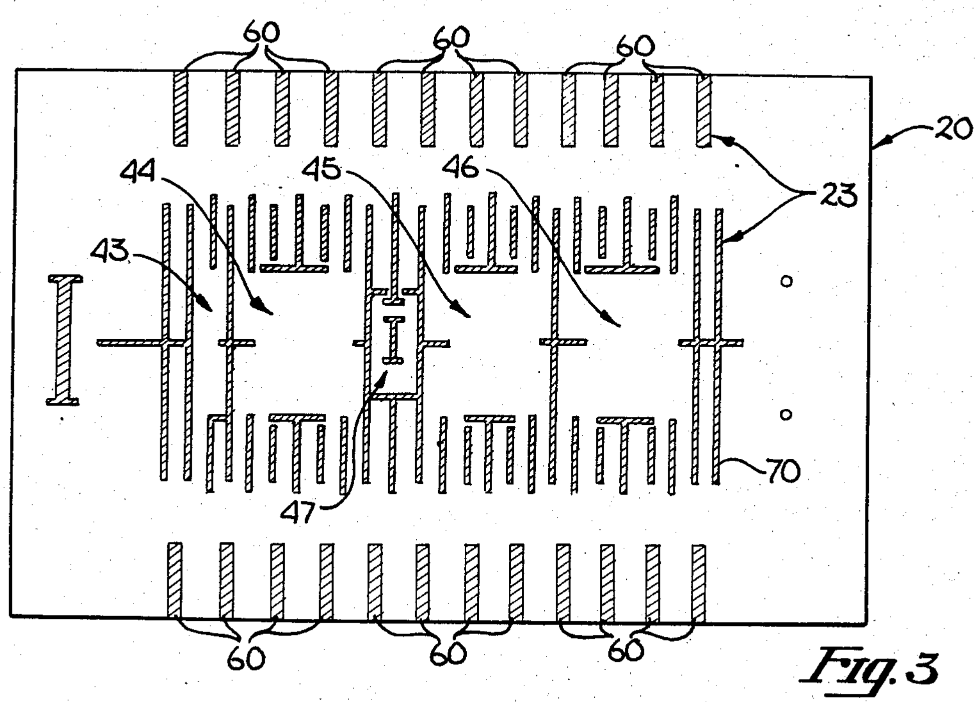
FIG. 3 is a view of the opaque conductor disposed on the first substrate of the presently preferred embodiment.

The opaque conductive stripes designated generally 23 on the first substrate are best shown in FIG. 3. In the presently preferred embodiment, these conductive opaque stripes 23 are disposed on the same surface of the first substrate 20 as are the transparent conductive areas 21. (Note, however, that for purposes of clarity and explanation FIG. 3 only illustrates the opaque stripes and not the transparent conductive areas.) These opaque conductive stripes 23 are disposed on the first substrate 20 by photo fabrication techniques, thick film techniques, masked evaporation, vacuum deposition, pyrolytic deposition or other known methods for defining lines and areas on substrates. Preferably a mask is placed over the substrate surface with the indicia and other transparent stripes 21 shown in FIG. 2 formed thereon. The mask has an opening substantially identical to the stripes 23 of FIG. 3. The substrate with the mask thereon is placed in a vacuum deposition chamber and the selected material is deposited through the opening to form stripes 23. The opaque conductive stripes 23 are disposed across the substrate and define unstriped areas for the transparent indicia areas which comprise the indicia digits 43, 44, 45, 46 and separating mark 47. It is within the scope of the invention to form stripe 23 prior to stripes 21.

In the presently preferred embodiment, the opaque stripes 23 are uniformly spaced across substrate 20 to form a decorative symmetrically appearing watch face. However, besides forming the decorative appearing watch face, selective stripes serve as conductive leads and join the transparent leads 58 to the transparent conductive indicia members, while others only serve a cosmetic function (This distinction is best shown in FIGS. 4 and 5). The opaque stripes 23 are either conductive leads or dummy stripes and visual inspection will not reveal a distinction. Referring particularly to FIG. 5 and display digit 46, the opaque conductive stripe 68 is connected to the transparent conductive area 57, lead 63 to area 56, lead 62 to area 54, lead 66 to area 55, lead 64 to area 53, lead 67 to area 52 and lead 65 to area 51, while each opaque stripe 70 is not connected to any lead. Each opaque lead 62, 63, 64, 65, 66, 67 and 68 is in turn coupled to the transparent lead which is coupled to the opaque lead 60 which is coupled to the power source 40. The dummy stripes 70 (the opaque stripes which are not leads) do not intersect or contact either the transparent leads 58, the opaque leads 60, or any other transparent conductive area labeled generally 21 or any opaque conductive stripe labeled generally 23. These dummy stripes 70 only serve to improve the symmetry and decorative appearance of the face. The function of the series of opaque conductive areas 60 which are separated from the opaque stripes generally labeled 23 are also for cosmetic purposes and are best shown in FIG. 3.

In manufacturing the presently preferred embodiment, the transparent conductive areas labeled generally 21 (FIG. 2) are disposed on the first substrate 20 by methods heretofor described. The opaque conductive stripes labeled generally 23 (FIG. 3) are then disposed on the first substrate 20, by methods previously described. The opaque conductive stripes 23 are aligned in relation to the transparent conductive areas 21 as is best shown in FIG. 4. The transparent conductive areas generally 21, which form the indicia members are disposed within the vacant areas surrounded by the opaque conductive stripes generally 23. It is important that proper alignment occur and that none of the transparent conductive areas intersect any of the opaque conductive stripes except those designated as the conductive leads. Thus, by masking, jig assembly or other known methods for disposing lines or areas on substrates, the specific opaque conductive leads may be formed such that they selectively intersect the proper transparent conductive areas. The remainder of the opaque conductor stripes do not intersect the transparent conductors and serve only as dummy stripes 70 and enhance the symmetrical decorative appearance of the watch-face. The opaque conductive leads 60 also intersect the transparent conductive leads 58 thereby forming a conductive path from the voltage source 40 to each of the transparent conductive areas which form the display digits.

The position of the second substrate 30 is shown by the dotted line in FIG. 4. The second substrate in the presently preferred embodiment 30 is normally made of glass. However, any substrate which is compatible with the liquid crystal and which is reflective, may be utilized. In the preferred form, the substrate 30 has a conductive reflective coating or layer 31 thereon which covers a substantial portion of the glass, especially a substantial portion within the broken line area 30, the layer 31 is a planar continuous solid layer. This layer 31 is disposed by chemical coating, masked evaporation, photoresist coating, thick film techniques, or evaporation of other known methods for forming a continuous layer. The layer 31 may be made from any reflective conductive material and in the presently preferred embodiment, is made from gold. The reflectivity of layer 31 may result from the character of the material, the thickness of material, the interface characteristic or other means for creating reflectivity. The conductivity similarily may be due to the material or additive thereto, or other means to facilitating conductance. It should be noted that the layer 31 is solid, reflective and conductive, unlike any of the prior art. One alternate embodiment that may be employed as said layer 31, is a composite of a dielectric material and indium oxide. The dielectric may comprise a plurality of layer of silicon and silicon oxide (e.g. both alternating layers of 1000 A to 2000 A, which are reflective and form a solid continuous layer. Atop the silicon, silicon oxide layer, is a layer of indium oxide or tin oxide which is conductive and need not cover a substantial portion of the dielectric reflective layer, that is it may be formed into pads of the same size as the indicia members.

The assembly of the presently preferred embodiment is accomplished by disposing the first substrate 20 over the second substrate 30 as is shown in FIG. 1. These substrates, when secured in place, are aligned. When assembled, the transparent conductive areas and opaque conductive leads will be disposed over the reflective conductive second substrate. However, the transparent leads 58 and the opaque stripes 60 will be positioned beyond the perimeter of the second substrate. Thus, when a potential is applied to any of the individual indicia areas on the first substrate 20, a selected potential is applied across the liquid crystal via the reflective conductive surface 31.

A feature of the present invention is that the critical alignment between the first and second substrate is eliminated. In prior art liquid crystal display a precise alignment between the first and second substrates was required. Improper alignment resulted in not only the leads becoming illuminated, but portions of the improperly aligned indicia digits could not form a potential difference, and hence the entire digit may not appear illuminated. These problems were created due to precise alignment requirements, where potential differences were required to be formed in precise locations between the first and second substrates. In the present invention the second substrate has a solid conductive relfective surface. The use of the solid characteristic results in the indicia members always being disposed in alignment with the conductive surface of the second substrate. Thus, a potential difference may be formed which will energize the liquid crystal, and create the desired display. However, since the second substrate has one surface which is solid, conductive and reflective, each opaque lead connected to each indicia area also forms a potential difference between itself and the second substrate. Since a potential difference is formed, the liquid crystal between the opaque lead of the first substrate and the second substrate becomes energized. In the prior art this energizing caused the leads to become illuminated, activated or visually observable. However, since the leads in the present invention are opaque or blending they form an optical shield and hence the opaque leads do not appear lighted. The leads may be formed from a substance that is the same color and has the same reflective properties of the reflective conductive layer on the second substrate. When the display is formed in this fashion, the opaque conductive leads become an optical shield. Even though the liquid crystal is energized beneath each of the conductive leads, no contrast is visible because the lead itself shields the energized liquid crystal from view. It is however, the broad scope of the invention to employ an opaque material which because of its optical properties or the interaction of its properties and that of the second substrate (and its coating) or because of the combined properties, form the optical shield.

Thus, the present invention provides a liquid crystal display which has no critical alignment problems between the first and second substrates yet is still cosmetically pleasing to the eye. Another desirable characteristic derived from a liquid crystal display device utilizing a solid reflective conductive surface on the second substrate is that a very sharp contrast occurs between the energized and non-energized liquid crystal, thereby providing a very readable display which has a wide angle of viewing. It should be noted that alignment is still critical in the disposition of the transparent conductive indicia areas 21 and the opaque conductive leads 23 on the first substrate. However, this disposition can be accomplished by photo fabrication techniques, masking by jig or other known methods, without any burdensome problems. Thus, this invention may be made subject to mechanical alignment techniques which will result in labor saving, and inexpensive manufacture of liquid crystal display devices. It will also offer immediate advantages in that misalignment problems will be minimized.

I claim:

1. A liquid crystal display comprising:

a first substrate having a plurality of indicia members communicating with an electrical source, said indicia members being selectively energized by said electrical source;

a second substrate substantially parallel to said first substrate and having at least a portion of one surface being conductive said portion of said one surface being configured on said second substrate such that said portion entirely circumscribes each perpendicular geometric projection of said indicia members onto said second substrate regardless of the precision of alignment of said indicia members with respect to said second substrate;

a spacing means for spacing said first substrate from said second substrate, said spacing means and said first and second substrates defining a cavity;

a liquid crystalline substance filling said cavity; and a plurality of conductive leads disposed on said first substrate and selectively coupling said indicia members to an electrical source, said plurality of conductive leads having a perpendicular, geometric projection onto said conductive portion of said second substrate, shielding said liquid crystalline substance between said leads and said projection of said leads onto said conductive portion from view and having substantially similar optical properties as said portion of said one surface of said second substrate, whereby said indicia members and plurality of leads may be energized by an electrical source without said leads being readily visible and without the need for the alignment of said indicia members and plurality of leads with respect to said second substrate to be precise.

2. The display of claim 1 wherein said leads are opaque.

3. The display of claim 1 wherein said indicia members are indium oxide and said leads are gold.

4. The display of claim 1 wherein said portion of said one surface on said second substrate and said leads on said first substrate have substantially the same color and reflective properties.

5. The display of claim 1 wherein substantially all of said one surface of said second substrate is conductive.

6. In an liquid crystal display in combination with a first substrate having one surface with a plurality of conductive indicia members to be displayed, said first substrate disposed adjacent to and approximately parallel to a second substrate, a liquid crystalline substance being disposed between said first and second substrates, the improvement comprising:

a portion of said second substrate having a conductive surface, said portion selectively configured to entirely circumscribe each perpendicular geometric projection of each of said indicia members onto said second substrate regardless of precision of alignment of said indicia members with respect to said second substrate; and a plurality of conductive leads selectively coupled to each of said indicia members, each of said conductive leads having substantially the same optical properties as said portion of said one surface of said second substrate, said conductive leads also substantially shielding said liquid crystalline substance between said leads and second substrate from view.

7. The display of claim 6 wherein each of said leads are opaque, and reflective.

8. The display of claim 6 wherein: said conductive portion of said second substrate includes substantially all of one surface of said second substrate.

* * * * *